(12) United States Patent
Sun et al.

(10) Patent No.: US 8,284,517 B1
(45) Date of Patent: Oct. 9, 2012

(54) PERPENDICULAR MAGNETIC RECORDING HEAD

(75) Inventors: Hai Sun, Milpitas, CA (US); Jinqiu Zhang, Fremont, CA (US); Hongping Yuan, Fremont, CA (US); Donghong Li, Pleasanton, CA (US); Liubo Hong, San Jose, CA (US); Yong Shen, Saratoga, CA (US)

(73) Assignee: Western Digital (Fremont), LLC, Fremont, CA (US)

(*) Notice: Subject to any disclaimer, the term of this patent is extended or adjusted under 35 U.S.C. 154(b) by 0 days.

(21) Appl. No.: 13/372,775

(22) Filed: Feb. 14, 2012

Related U.S. Application Data (62) Division of application No. 12/121,540, filed on May 15, 2008, now Pat. No. 8,136,224.

(51) Int. Cl.
*G11B 5/127* (2006.01)

(52) U.S. Cl. .................................................. 360/125.1

(58) Field of Classification Search ............... 360/125.9, 360/125.1, 125.07, 125.11, 121, 125.2, 125.14, 360/125.08
See application file for complete search history.

(56) References Cited

U.S. PATENT DOCUMENTS

| | | | |
|---|---|---|---|
| 5,418,095 A | 5/1995 | Vasudev et al. | |
| 5,422,309 A | 6/1995 | Zettler et al. | |
| 5,726,094 A | 3/1998 | Schwalke et al. | |
| 6,528,398 B1 | 3/2003 | Ghandehari et al. | |
| 6,602,794 B1 | 8/2003 | Kye | |
| 6,989,971 B2 | 1/2006 | Lin et al. | |
| 7,030,031 B2 | 4/2006 | Wille et al. | |
| 7,077,992 B2 | 7/2006 | Sreenivasan et al. | |
| 7,122,079 B2 | 10/2006 | Xu et al. | |
| 7,179,396 B2 | 2/2007 | Sreenivasan | |
| 7,186,656 B2 | 3/2007 | Sreenivasan | |
| 7,205,244 B2 | 4/2007 | Stacey et al. | |
| 7,228,617 B2 | 6/2007 | Lin et al. | |
| 7,230,801 B2 | 6/2007 | Lin et al. | |
| 7,444,740 B1 | 11/2008 | Chung et al. | |
| 7,768,742 B2 | 8/2010 | Giorgis et al. | |
| 7,785,666 B1 | 8/2010 | Sun et al. | |
| 7,848,053 B2 | 12/2010 | Mochizuki et al. | |
| 8,015,692 B1 * | 9/2011 | Zhang et al. | 29/603.14 |
| 8,136,224 B1 | 3/2012 | Sun et al. | |
| 8,136,225 B1 * | 3/2012 | Zhang et al. | 29/603.12 |
| 2003/0189798 A1 | 10/2003 | Lin et al. | |
| 2004/0061982 A1 | 4/2004 | Lin et al. | |
| 2005/0024789 A1 | 2/2005 | Lin et al. | |
| 2009/0279207 A1 | 11/2009 | Sasaki et al. | |
| 2010/0112486 A1 * | 5/2010 | Zhang et al. | 430/314 |
| 2012/0076621 A1 * | 3/2012 | Thompson et al. | 414/267 |
| 2012/0076622 A1 * | 3/2012 | Starr et al. | 414/273 |

OTHER PUBLICATIONS

Notice of Allowance dated Nov. 22, 2011 from U.S. Appl. No. 12/121,540, 11 pages.

* cited by examiner

*Primary Examiner* — Allen Cao (57) ABSTRACT

A perpendicular magnetic recording (PMR) head comprises a PMR pole having at least one side, a bottom, and a top wider than the bottom, a first portion of the at least one side being substantially vertical, a second portion of the at least one side being nonvertical, the top portion having a width not greater than one hundred fifty nanometers. The PMR head further comprises a nonmagnetic layer surrounding the bottom and the at least one side of the PMR pole, an intermediate layer substantially surrounding at least the second portion of the at least one side of the PMR pole, and a planarization stop layer adjacent to the first portion of the at least one side of the PMR pole.

6 Claims, 8 Drawing Sheets

PERPENDICULAR MAGNETIC RECORDING HEAD

CROSS REFERENCE TO RELATED APPLICATIONS

This application is a divisional of U.S. patent application Ser. No. 12/121,540, filed on May 15, 2008, which is hereby incorporated by reference in its entirety.

BACKGROUND

Figure 1:
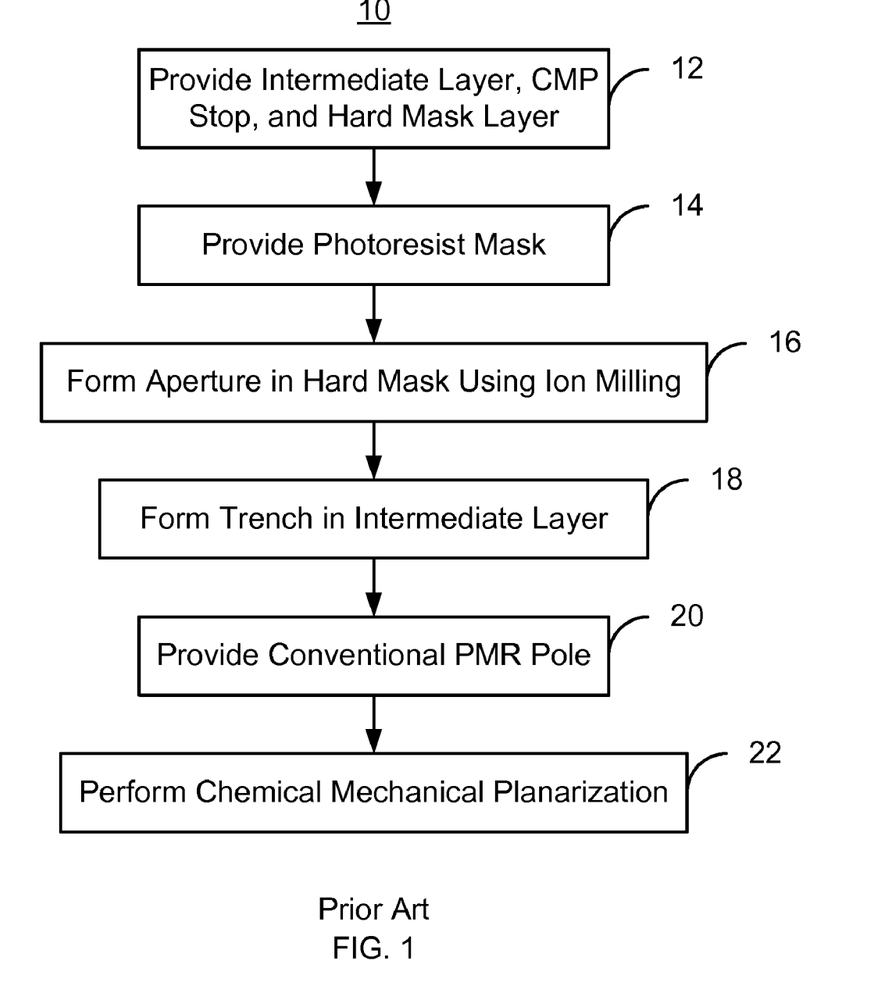
FIG. 1 is a flow chart depicting a conventional method for fabricating a PMR head.

FIG. 1 is a flow chart depicting a conventional method 10 for fabricating a conventional perpendicular magnetic recording (PMR) transducer. For simplicity, some steps are omitted. The conventional method 10 is used for providing a PMR pole. An intermediate layer, chemical mechanical planarization (CMP) stop layer and hard mask layer are provided, via step 12. The intermediate layer is typically aluminum oxide. The CMP stop layer may include Ru, while the hard mask layer may include NiCr. A photoresist mask is provided on the hard mask layer, via step 14. The photoresist mask includes an aperture above the portion of the intermediate layer in which the PMR pole is to be formed. A conventional aperture is formed in the hard mask layer, via step 16. Typically, this is accomplished through using a conventional ion mill. Step 16 also includes forming a conventional aperture in the CMP stop layer. Thus, through ion milling in step 16, the pattern of the photoresist mask is transferred to both the hard mask and the CMP stop layer in a conventional manner.

Using the hard mask and photoresist mask, a trench is formed in the aluminum oxide layer, via step 18. Step 18 is typically performed using an alumina reactive ion etch (RIE). The top of the trench 66 is desired to be wider than the trench bottom. In addition, the trench may extend through the aluminum oxide intermediate layer. As a result, the PMR pole formed therein will have its top surface wider than its bottom. Consequently, the sidewalls of the PMR pole will have a reverse angle. The conventional PMR pole materials are deposited, via step 20. A CMP is then performed, via step 22. The stop layer provided in step 12 is used to terminate the CMP. Thus, the conventional PMR pole is provided. Subsequent structures, such as a write gap and shields, may then be provided.

Although the conventional method 10 may provide the conventional PMR transducer, there may be drawbacks. Use of the photoresist mask and hard mask may result in relatively large variations in the critical dimension of the conventional PMR pole. The critical dimension corresponds to the track width of the conventional PMR pole. Such variations in track width may adversely affect fabrication and performance. In addition, the conventional PMR pole may be relatively large in size. Using conventional photolithography, the critical diameter of the apertures formed in step 16, and thus the trench provided in step 18, is typically greater than 150 nm. Consequently, without more, the conventional PMR poles formed using the conventional method 10 may not be usable in high density magnetic recording technology.

Accordingly, what is needed is an improved method for fabricating a PMR transducer.

SUMMARY

A method and system for providing a PMR pole in a magnetic recording transducer are disclosed. The method and system include providing a mask including a line on the intermediate layer. The line has at least one side, a top, and a bottom. The side(s) have an undercut such that the top of the line is wider than the bottom. The method further includes providing a hard mask on the PMR transducer. The hard mask includes an aperture corresponding to the line. Thus, an aperture in the hard mask corresponding to the line is provided. The method and system also include forming a trench in the intermediate layer under the aperture. The trench has a bottom and a top wider than the bottom. The method further includes providing a PMR pole, at least a portion of which resides in the trench.

DETAILED DESCRIPTION OF THE PREFERRED EMBODIMENTS

Figure 2:
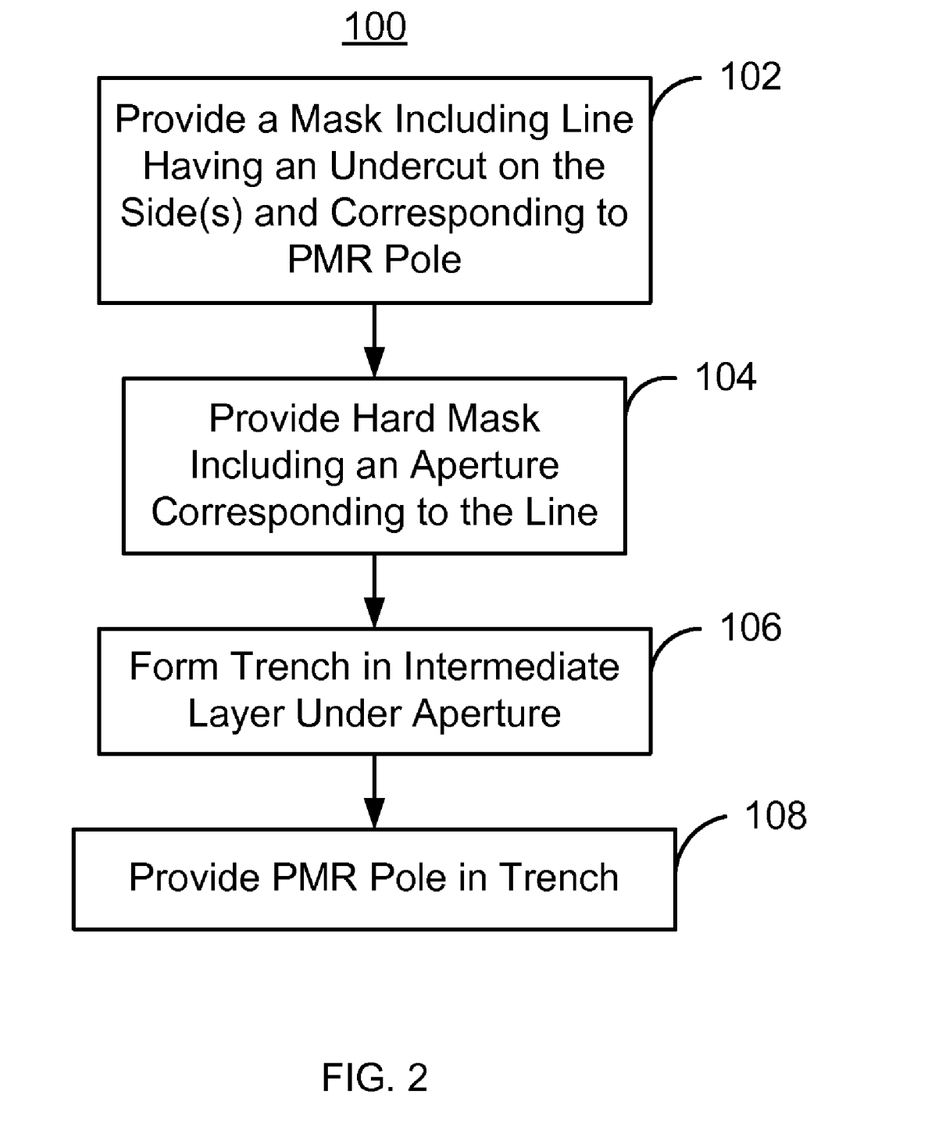
FIG. 2 is a flow chart depicting an exemplary embodiment of a method for fabricating a PMR transducer.

FIG. 2 is a flow chart depicting an exemplary embodiment of a method 100 for fabricating a PMR pole for a PMR transducer. For simplicity, some steps may be omitted. The PMR transducer being fabricated may be part of a merged head that also includes a read head (not shown) and resides on a slider (not shown). The method 100 also may commence after formation of other portions of the PMR transducer. The method 100 is also described in the context of providing a single PMR pole in a single magnetic recording transducer. However, the method 100 may be used to fabricate multiple transducers at substantially the same time. The method 100 and system are also described in the context of particular layers. However, in some embodiments, such layers may include multiple sub-layers.

In one embodiment, the method 100 commences after formation of the intermediate layer(s) in which the PMR pole is to reside. In one embodiment, the intermediate layer is an insulator such as alumina. The intermediate layer may reside on an underlayer. Further, in one embodiment, the underlayer layer may be an etch stop layer.

A mask is provided on the intermediate layer, via step 102. The mask includes a line that corresponds to the location of the PMR pole. The sides of the line are undercut. As a result, the bottom of the line is smaller than the top of the line. In one embodiment, the mask is a bilayer with the lower layer having a smaller critical dimension, or width, than the top layer. For example, the line may include a polydimethylglutarimide (PMGI) layer and photoresist layer. In such an embodiment, the PMGI and photoresist layers have different critical dimensions, or widths. In addition, the mask may be formed using photolithographic techniques. In one embodiment, the mask may not be formed directly on the intermediate layer. For example, the mask may be formed on a planarization stop layer, such as a CMP stop layer. In another embodiment, the planarization stop layer might be provided at another time.

A hard mask is provided on the mask, via step 104. For example, the hard mask provided in step 104 may include a material such as NiCr and/or Cr. Furthermore, the hard mask includes an aperture corresponding to the line in the mask. The aperture in the hard mask resides in substantially the position occupied by the line. In one embodiment, step 104 includes depositing a hard mask layer, then removing the line for the mask without removing all of the hard mask layer. For example, in one embodiment, the line may be removed for example through a lift-off process. Substantially only the portion of the hard mask layer on the line would be removed. Thus, the aperture in the hard mask corresponding to the line may be provided.

A trench is formed in the intermediate layer under the aperture, via step 106. The trench has a bottom and a top wider than the bottom. Consequently, the trench formed is appropriate for a PMR pole. In one embodiment, the trench extends through the intermediate layer. However, in another embodiment, the trench might extend only partially through the intermediate layer. In one embodiment, step 106 includes performing a RIE.

A PMR pole is provided, via step 108. At least a portion of the PMR pole resides in the trench. In one embodiment, only part of the PMR pole resides within the trench in the intermediate layer. Thus, the top of the PMR pole would be above the top of intermediate layer. In an alternate embodiment, the entire PMR pole resides within the trench. Formation of the PMR pole in step 108 may include providing a nonmagnetic layer in the trench. Such a nonmagnetic layer might be used to adjust the critical dimension, and thus the track width, of the PMR pole. The nonmagnetic layer may also be used to adjust the height of the PMR pole. The PMR pole would reside on such a nonmagnetic layer. In one embodiment, the nonmagnetic layer may be provided using atomic layer deposition (ALD). A seed layer for the PMR pole may also be provided, for example on the nonmagnetic layer. In another embodiment, the nonmagnetic layer may also function as a seed layer. The layer(s) for the PMR pole may then be blanket deposited. A planarization, such as a CMP, may be performed. In addition, the geometry of the PMR pole might be further adjusted using an ion beam etch. Thus, the PMR pole may be formed. Although described above as part of formation of the PMR pole, at least some of the steps of providing the nonmagnetic layer, the planarization stop layer and/or the seed layer may be considered separate from providing the PMR pole.

Using the method 100, at least part of a PMR transducer may be formed. The method 100 utilizes the line having undercut sides to provide the aperture in the hard mask. In one embodiment, the line in the mask may have a critical dimension, or width, that is not larger than one hundred-fifty nanometers. The critical dimension of the line might also be not more than one hundred nanometers. As a result, the critical dimension for the PMR pole may be not more than one hundred-fifty nanometers in one embodiment. In another embodiment, the critical dimension might be not more than on hundred nanometers. In one such embodiment, the line and thus the PMR pole may have a critical dimension on the order of fifty nanometers or less. Consequently, a low critical dimension PMR pole may be formed. The PMR transducer formed may thus be used at higher densities. For example, the PMR transducer formed might be usable in 400 Gb/in$^2$ or higher density transducers. In addition to improved resolution, formation of the line in the mask in step 102 may have improved depth of focus and greater robustness than for the conventional method 10. Moreover, in one embodiment, the hard mask may be formed in step 104 using a lift-off of the line for the mask. Variations in the critical dimension of the hard mask may thus be reduced because the hard mask may be formed in step 104 without the use of an ion beam etch. Consequently, processing may be simplified and more readily extended to higher resolutions. The higher resolution PMR transducer may thus be made more manufacturable. Using the method 100, therefore, a PMR transducer usable at higher densities may be fabricated.

Figure 3:
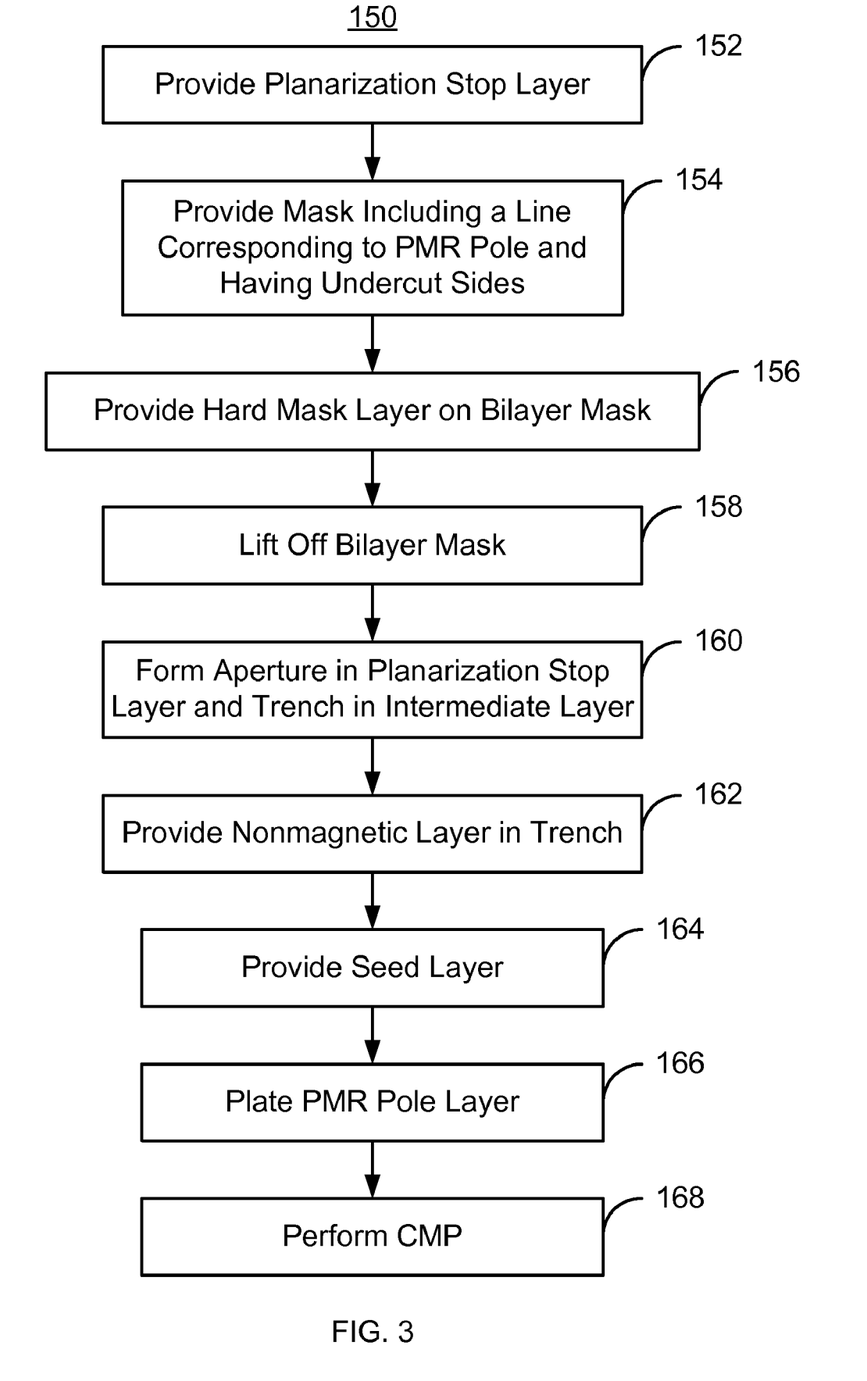
FIG. 3 is a flow chart depicting another embodiment of a method for fabricating a PMR transducer.

FIG. 3 is a flow chart depicting another exemplary embodiment of a method 150 for fabricating a PMR transducer. For simplicity, some steps may be omitted. FIGS. 4-12 are diagrams depicting an exemplary embodiment of a PMR transducer 200 as viewed from the ABS during fabrication. For clarity, FIGS. 4-12 are not to scale. Referring to FIGS. 3-12, the method 150 is described in the context of the PMR transducer 200. However, the method 150 may be used to form another device (not shown). The PMR transducer 200 being fabricated may be part of a merged head that also includes a read head (not shown) and resides on a slider (not shown). The method 150 also may commence after formation of other portions of the PMR transducer 200. The method 150 is also described in the context of providing a single PMR transducer. However, the method 150 may be used to fabricate multiple transducers at substantially the same time. The method 150 and device 200 are also described in the context of particular layers, such as a PMR pole layer(s) and planarization stop layer(s). However, in some embodiments, such layers may include multiple sublayers.

The method 150 commences after an intermediate layer is provided. The intermediate layer may be an alumina layer. A planarization stop layer is provided on the intermediate layer, via step 152. In one embodiment, the planarization stop layer is a CMP stop layer and may include materials such as Ta and/or Ru.

Figure 4:
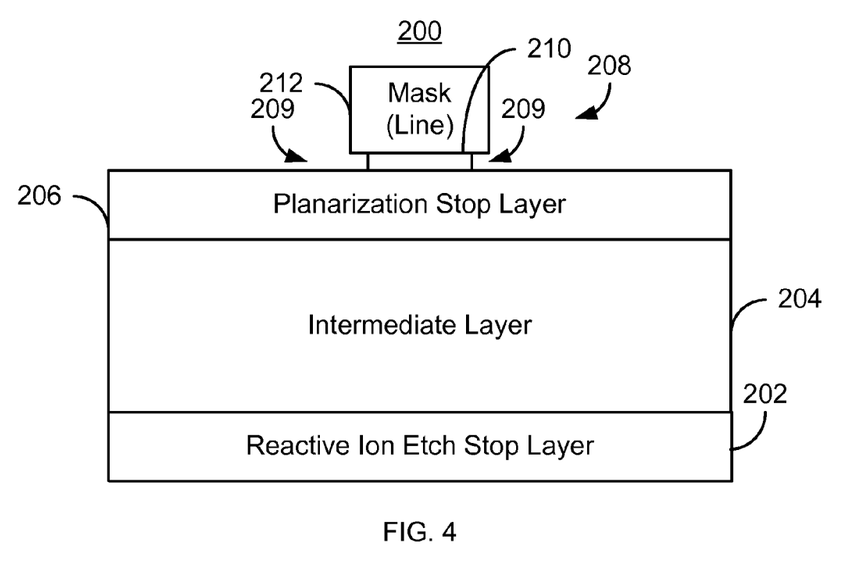
FIGS. 4-12 are diagrams depicting an exemplary embodiment of a perpendicular magnetic recording transducer during fabrication.
Figure 5:
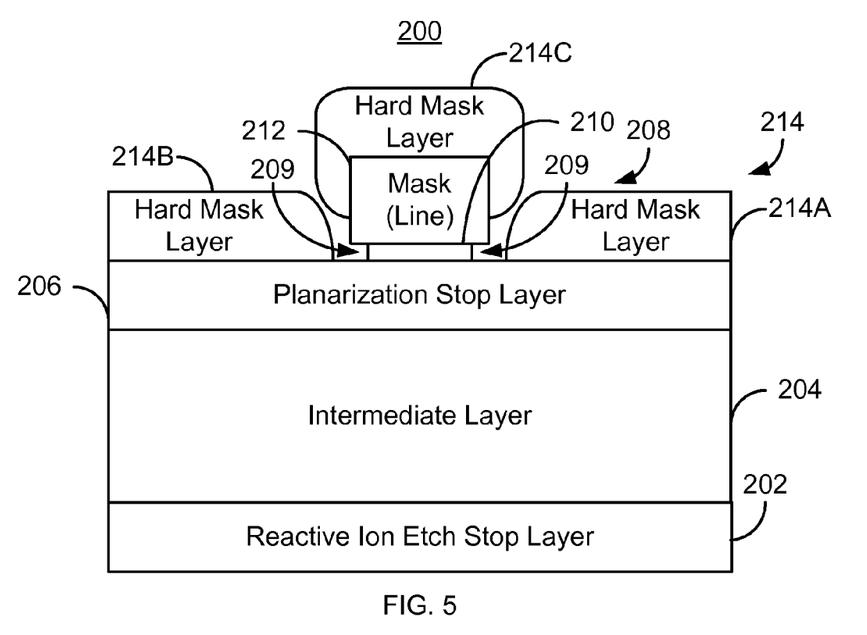

A mask having undercut side(s) is provided on the CMP stop layer, via step 154. The mask includes a line that corresponds to the location of the PMR pole. Moreover, the side(s) of the line are undercut. Consequently, the bottom of the line has a smaller width than the top of the line. In one embodiment, the undercut is sharp. However, in another embodiment, the undercut may not be. FIG. 4 depicts a portion of the PMR transducer 200 after step 154 is performed. In the embodiment shown, an underlayer 202 that may also functions as an etch stop layer 202, is shown. The underlayer 22 may include materials such as NiCr. In addition, an intermediate layer 204 is also depicted. The PMR transducer 200 also includes a planarization stop layer 206 and a mask 208. In the embodiment shown, the mask 208 is shown as consisting of a line. However, in another embodiment, the mask 208 may include other features. The mask 208 includes undercuts 209. In the embodiment shown, the mask 208 is a bilayer having layers 210 and 212. The lower layer 210 has a smaller critical dimension, or width, than the top layer 212. For example, the line may include a PMGI layer 210 and a photoresist layer 212. However, in another embodiment, the undercuts 209 might be achieved in another manner.

Figure 6:
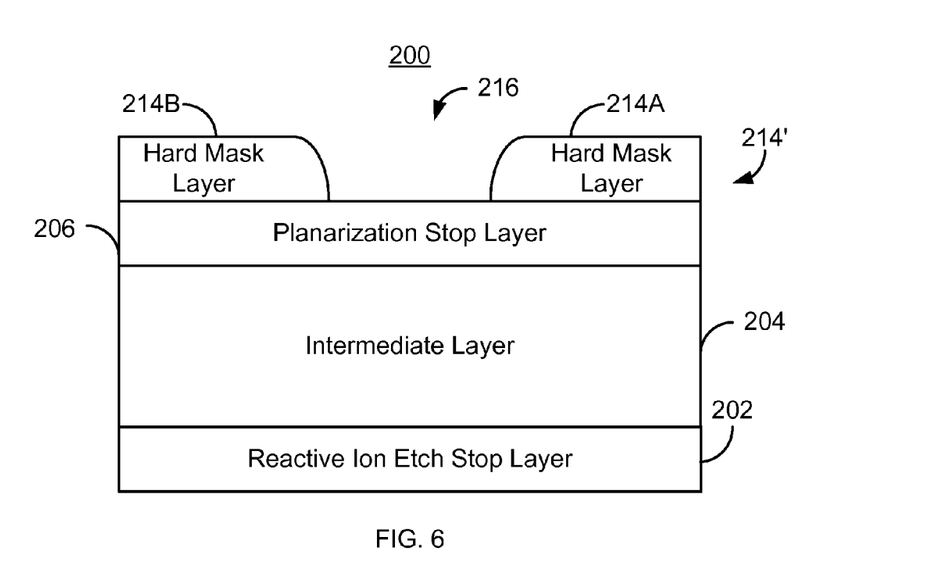

A hard mask layer is provided on the PMR transducer 200, via step 156. More specifically, the hard mask layer may be deposited on the mask 208. In one embodiment, step 158 includes deposition of a material such as NiCr and/or Cr, for example using an ion beam deposition process. FIG. 6 depicts the PMR transducer 200 after step 156 is performed. Thus, a hard mask layer 214 has been provided. Because of the geometry of the mask 208, particularly the undercuts 209, the hard mask layer 214 is discontinuous. Thus, the hard mask 214 includes portions 214A, 214B, and 214C.

Figure 7:
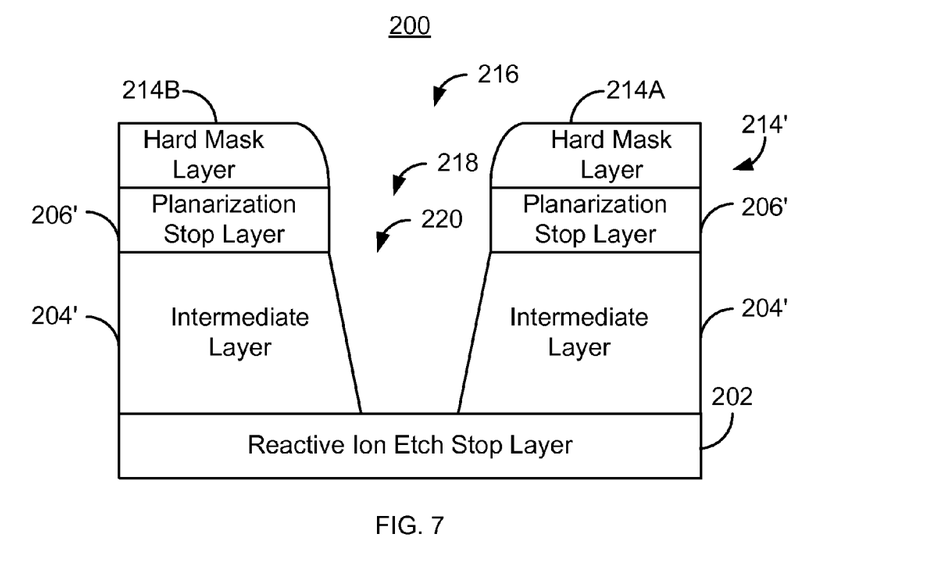

The line 208 is removed, via step 158. In an embodiment in which other structures (not shown) are present for the mask 208, step 158 may be performed such that only the line 208 is removed. In another embodiment, the entire mask 208 may be removed. In one embodiment, a lift-off process is used in step 158. FIG. 7 depicts the PMR transducer 200 after step 158 is completed. Because the line 208 has been removed, the portion 214C of the hard mask layer 214 has also been removed. Consequently, hard mask 214' remains. The hard mask 214' includes portions 214A and 214B. The hard mask 214' include aperture 216 that corresponds to the line 208. The aperture 216 resides in substantially the position occupied by the line 208.

A RIE is performed to form a trench in the intermediate layer 204, via step 160. In one embodiment, the RIE is performed utilizing a Cl-containing gas. The RIE performed in step 204 removes both the exposed portion of the planarization stop layer 206 and at least a portion of the underlying intermediate layer 204. FIG. 7 depicts the PMR transducer after step 160 is performed. Thus, an aperture 218 has been formed in the planarization stop layer 206'. Further, a trench 220 has been formed in the intermediate layer 204'. The aperture 218 and the trench 2220 are formed under the aperture 216. The trench 220 has a bottom and a top wider than the bottom. In addition, the trench 220 is shown as extending through the intermediate layer 204', exposing the layer 202. However, in an alternate embodiment, the trench 220 may not extend through the intermediate layer 204'.

The PMR pole is then formed. This may occupy a number of steps. In one embodiment, a nonmagnetic layer is provided in the trench 220, via step 162. At least a portion of the nonmagnetic layer resides in the trench 220. In one embodiment, step 162 may be performed using ALD. However, in another embodiment, another method for providing the nonmagnetic layer may be used. Alternatively, step 162 might be omitted.

Figure 8:
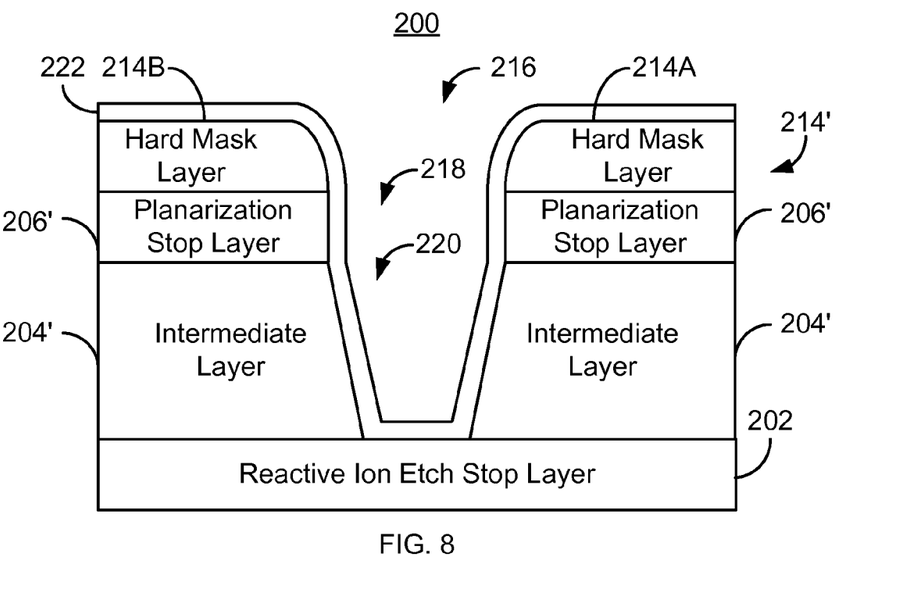

FIG. 8 depicts the PMR transducer 200 after step 162 is performed. Thus, a nonmagnetic layer 222 has been deposited. Because the nonmagnetic layer 222 is magnetically separate from the pole being formed, the nonmagnetic layer 222 may be used to reduce the critical diameter of the PMR pole. Stated differently, the nonmagnetic layer may be considered to make the trench 220 less wide and, in one embodiment, shallower. Thus, the thickness of the nonmagnetic layer 222 may be used to tune the width and height of the PMR pole being formed. The width the PMR pole being formed may be reduced by twice the thickness of the nonmagnetic layer 222, while the height of the PMR pole is reduced by the thickness of the nonmagnetic layer. For example, in one embodiment, the nonmagnetic layer 222 might be at least fifty and not more than four hundred Angstroms. Consequently, use of a nonmagnetic layer 222 in such an embodiment allows the width of the PMR pole being formed to be reduced by one hundred to eight hundred Angstroms.

Figure 9:
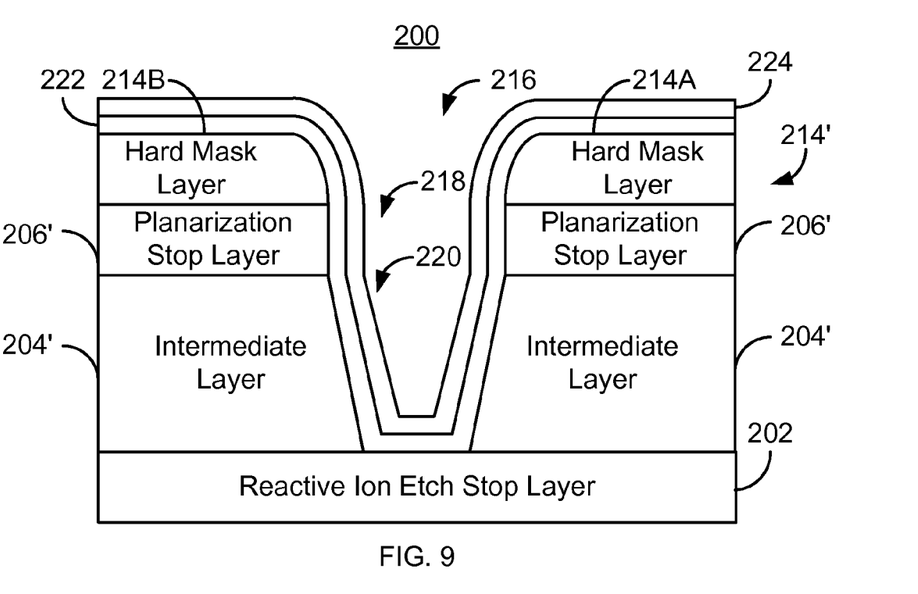

A seed layer may optionally be provided on the nonmagnetic layer 222, via step 164. Such a seed layer may be nonmagnetic or magnetic. If magnetic, the seed layer may be magnetically indistinct from the PMR pole. Thus, the seed layer may be considered part of the PMR pole. In another embodiment, the seed layer may be nonmagnetic. In such an embodiment, the seed layer would be magnetically distinct from the PMR pole. In one embodiment, the seed layer and the nonmagnetic stop layer may function as a single layer or be merged into a single layer. FIG. 9 depicts the PMR transducer 200 after step 164 is performed. Thus, the nonmagnetic layer 222 and a seed layer 2224 are shown. A portion of each of the nonmagnetic layer 222 and the seed layer 224 resides in the trench 220. However, another portion of each of the nonmagnetic layer 222 and the seed layer 2224 also resides on and next to the hard mask 214' and the planarization stop layer 206'. Thus, a portion of the nonmagnetic layer 222 and a portion of the seed layer 224 are above the top of the intermediate layer 204'

Figure 10:
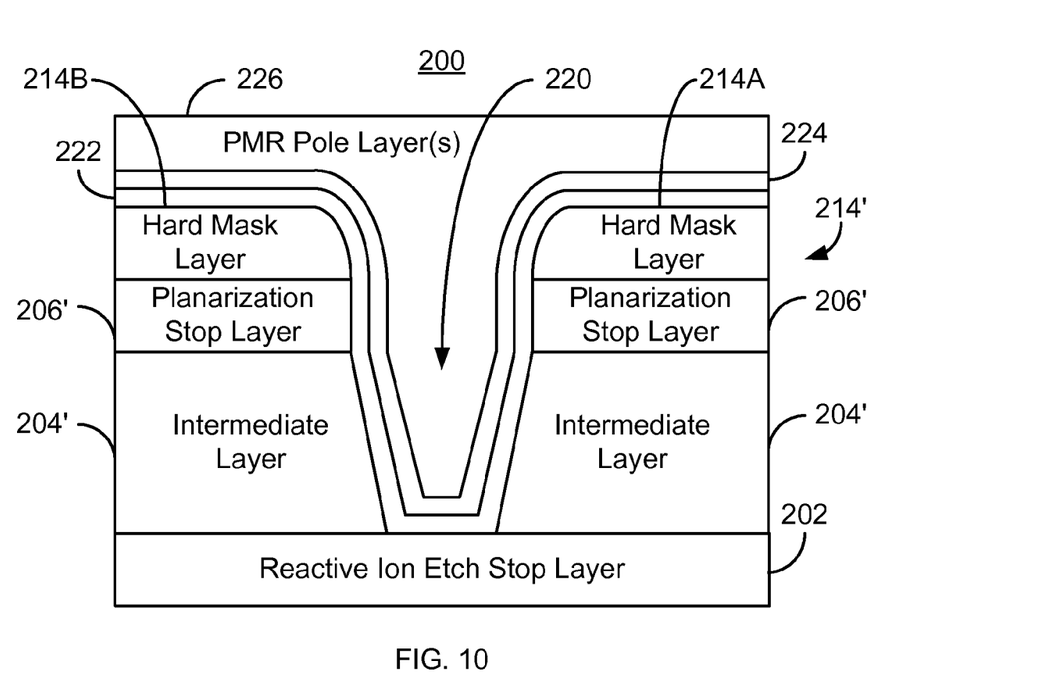

A PMR pole layer(s) may be provided, via step 166. Step 166 may include plating the PMR pole layer(s). In one embodiment, a single layer is used. However, in another embodiment, multiple layers might be used for the PMR pole. Consequently, multiple layers might be deposited in step 166. In the embodiment described, the PMR pole layer(s) are blanket deposited. However, in another embodiment, masking might be used. In one embodiment, the PMR pole layer is plated on the seed layer 224 and/or the nonmagnetic layer 222. FIG. 10 depicts the PMR transducer 200 after step 166 is performed. For simplicity, the apertures 216 and 218 are no longer separately labeled. Thus, the PMR pole layer 226 resides in the trench 220. However, another portion of the PMR pole layer 226 also resides on and next to the hard mask 214' and the planarization stop layer 206'. Thus, a portion of the PMR pole layer 226 is above the top of the intermediate layer 204'.

Figure 11:
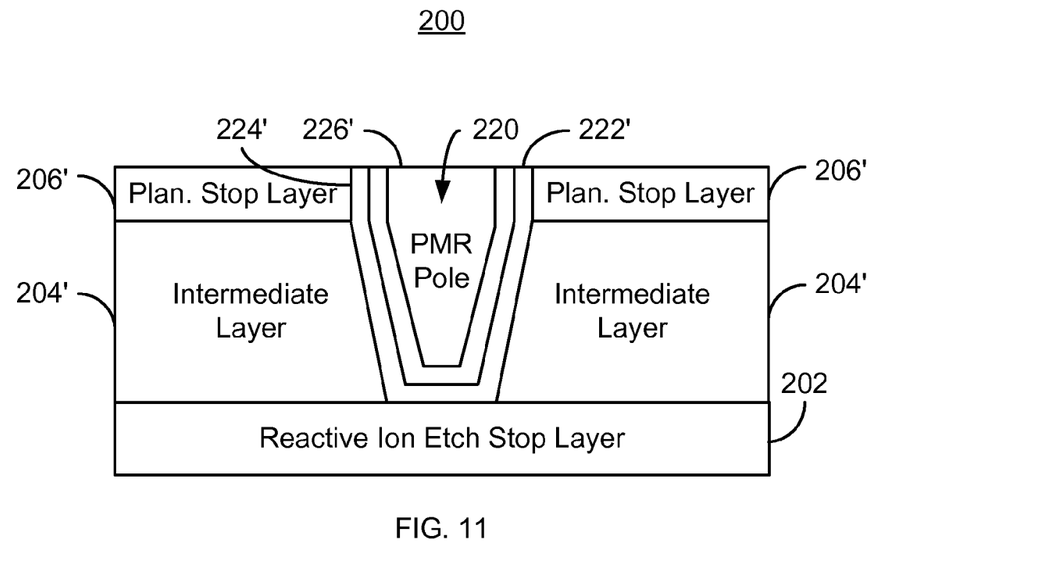

A CMP, or other planarization selected, is performed, via step 168. The CMP planarization may terminate when at least a portion of the planarization stop layer 206' remains. In addition, an ion beam etch or other processing might also be performed in step 168 to further configure the geometry of the PMR pole. FIG. 11 depicts the PMR transducer 200 after step 168 has been performed. Consequently, the PMR pole 226' has been formed from the PMR pole layer(s) 226. In addition, a portion of the nonmagnetic layer 222 and a portion of the seed layer 224, if present, have been removed. Consequently, only portions of the seed layer 224' and nonmagnetic layer 222' remain. In the embodiment shown, only a portion of the PMR pole 226' resides within the trench 220. This portion of the PMR pole 226' has a top wider than the bottom. Stated differently, there is a negative angle (as measured from vertical) for these portions of the sidewalls of the PMR pole 226'. A remaining portion of the PMR pole 226' is next to the planarization stop layer 206' and remaining portions of the nonmagnetic layer 222' and seed layer 224'. The sidewalls for this portion of the PMR pole 226' are s substantially vertical.

Figure 12:
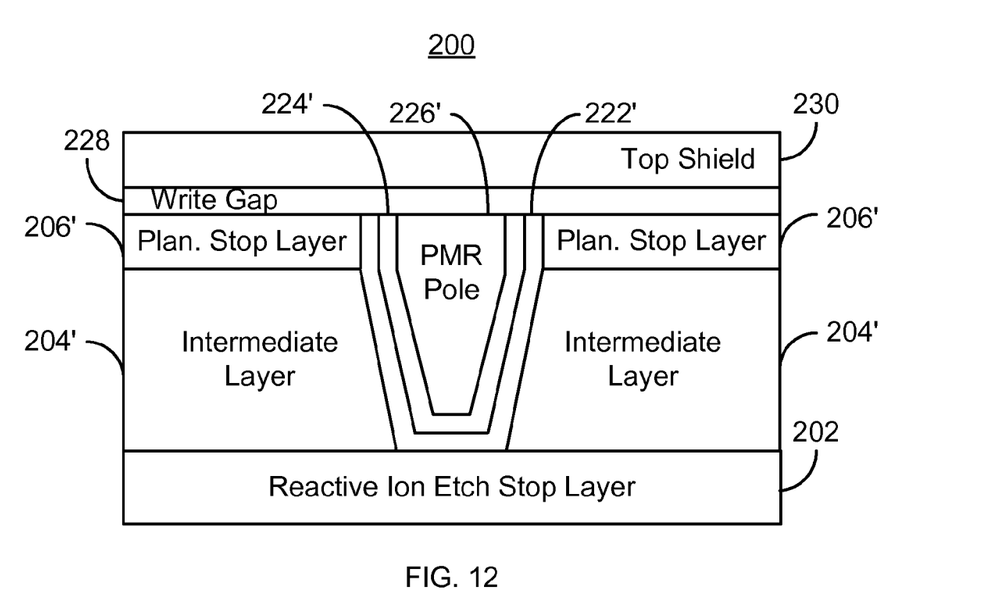

Fabrication of the PMR transducer 200 might then be completed. For example, a write gap, a shield, and other structures might be provided. FIG. 12 depicts the PMR transducer 200 after such structures are provided. Thus, the write gap 228 and top shield 230 are shown. In one embodiment, the write gap 228 may be an insulator, such as aluminum oxide. In another embodiment, other material(s) may be used.

Using the method 150, at least part of the PMR transducer 200 may be formed. The method 150 utilizes the line 208 having undercuts 209 in the side to provide the aperture 216 in the hard mask 214'. Use of a line 208 may have improved resolution. In one embodiment, the line 208 may have a critical dimension, or width, that is not larger than one hundred-fifty nanometers. The critical dimension of the line 208 might also be not more than one hundred nanometers. As a result, the critical dimension for the PMR pole 226' may be not more than one hundred-fifty nanometers in one embodiment. In another embodiment, the critical dimension might be not more than one hundred nanometers. In one such embodiment, the critical dimension may be fifty nanometers or less. The PMR transducer 200 may thus be used at higher densities. For example, the PMR transducer 200 might be usable in 400 Gb/in$^2$ or higher density transducers. In addition, the lift-off process used to remove the line 208' may eliminate etching of the hard mask layer 214. Thus, variations in the critical dimension of the aperture 216 may be reduced. Further, processing is simplified. Use of the nonmagnetic layer 222 and/or seed layer 224 may allow for further tailoring of the critical dimension of the PMR pole 226'. Consequently, processing may be simplified and more readily extended to higher resolutions. The higher resolution PMR transducer 200 may thus be made more manufacturable.

We claim:

1. A perpendicular magnetic recording (PMR) head comprising:
    a PMR pole having at least one side, a bottom, and a top wider than the bottom, a first portion of the at least one side being substantially vertical, a second portion of the at least one side being nonvertical, the top portion having a width not greater than one hundred fifty nanometers;
    a nonmagnetic layer surrounding the bottom and the at least one side of the PMR pole;
    an intermediate layer substantially surrounding at least the second portion of the at least one side of the PMR pole; and
    a planarization stop layer adjacent to the first portion of the at least one side of the PMR pole.

2. The PMR head of claim 1 further wherein the width is not more than one hundred nanometers.

3. The PMR head of claim 1 further comprising:
    a seed layer residing between the intermediate layer and the PMR pole.

4. A disk drive including a perpendicular magnetic recording (PMR) head comprising:
    a PMR pole having at least one side, a bottom, and a top wider than the bottom, a first portion of the at least one side being substantially vertical, a second portion of the at least one side being nonvertical, the top portion having a width not greater than one hundred fifty nanometers;
    a nonmagnetic layer surrounding the bottom and the at least one side of the PMR pole;
    an intermediate layer substantially surrounding at least the second portion of the at least one side of the PMR pole; and
    a planarization stop layer adjacent to the first portion of the at least one side of the PMR pole.

5. The disk drive of claim 4 further wherein the width is not more than one hundred nanometers.

6. The disk drive of claim 4 further comprising:
    a seed layer residing between the intermediate layer and the PMR pole.

* * * * *